April 14, 1964  G. J. LACHANCE  3,129,015
SEAT CONSTRUCTION FOR GROCERY CARTS
Filed Jan. 19, 1962  2 Sheets-Sheet 1
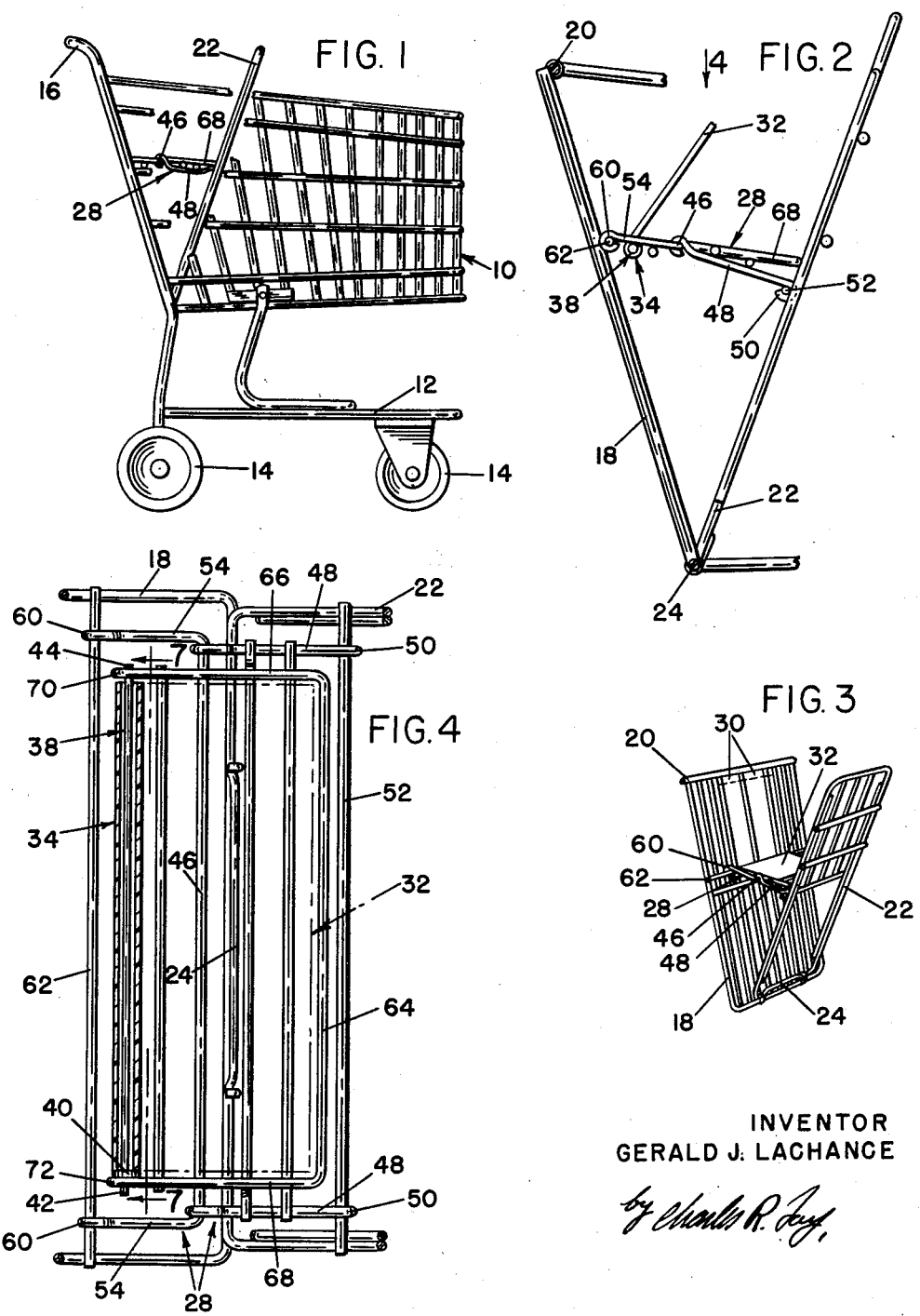
INVENTOR
GERALD J. LACHANCE
by Charles R. Fay
ATTORNEY April 14, 1964   G. J. LACHANCE   3,129,015
SEAT CONSTRUCTION FOR GROCERY CARTS
Filed Jan. 19, 1962   2 Sheets-Sheet 2
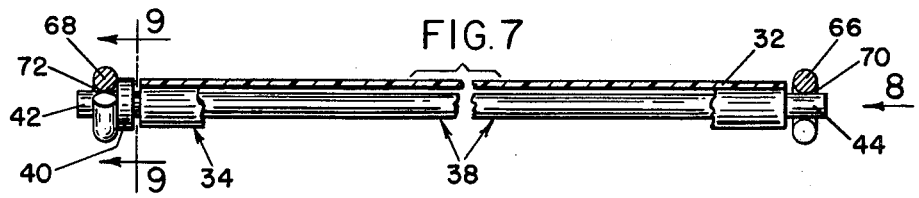
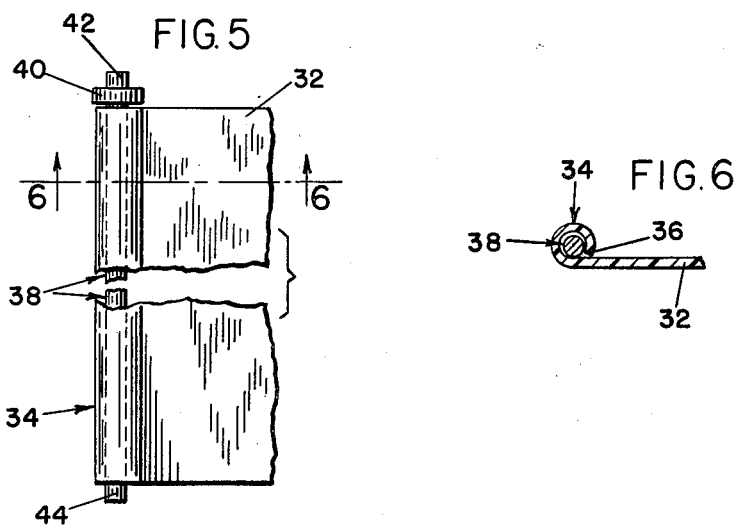
INVENTOR
GERALD J. LACHANCE
ATTORNEY

United States Patent Office 3,129,015
Patented Apr. 14, 1964

3,129,015
SEAT CONSTRUCTION FOR GROCERY CARTS
Gerald J. Lachance, North Brookfield, Mass., assignor to American Metal Products, Inc., Auburn, Mass., a corporation of Massachusetts
Filed Jan. 19, 1962, Ser. No. 167,300
4 Claims. (Cl. 280—33.99)

This invention relates to a new and improved folding seat construction for grocery carts, and more particularly to a new and improved sheet-like seat member preferably made of plastic which is adapted to fold down to form a seat covering the wire members of a connection between the usual swinging gate and the seat-supporting member, or alternatively to be pivoted upwardly to cover the leg holes in the gate. The cart construction per se may be as desired, according to conventional carts.

The novel construction herein presents an improvement over U.S. Patent No. 2,952,470 and one of the objects of this invention resides in the provision of a plane, solid seat member of the class described which has a generally rolled edge more or less in cylindrical tubular form for quick and easy sliding assembly thereof to a headed wire member which forms part of a wire frame forming the folding seat, said tubular edge having an extreme edge portion substantially contacting the seat member to hold the headed wire member thereto without any chance of becoming dislodged; the provision of a new seat member so formed as to be difficult for the customer to remove once assembled; and the provision of a tubular edge member for a seat of the class described which has a strong edge resisting deformation to better enable the parts to be put together, firmly holding the parts in the assembled relation against any accidental removal thereof, but still allowing replacement of the seat member by the use of a simple tool such as a screwdriver.

The invention further relates to arrangements and combinations of parts which will be hereinafter described and more particularly set forth in the appended claims.

Reference is to be had to the accompanying drawings, in which

FIG. 1 is a view in elevation of a cart embodying the present invention;

FIG. 2 is a view in elevation on an enlarged scale illustrating the seat construction;

FIG. 3 is a perspective view on a reduced scale;

FIG. 4 is a plan view, partly in section and on an enlarged scale, looking in the direction of arrow 4 in FIG. 2;

FIG. 5 is an inverted plan view on an enlarged scale with parts broken away illustrating the new seat member;

FIG. 6 is an enlarged section on line 6—6 of FIG. 5;

FIG. 7 is an enlarged section on line 7—7 of FIG. 4 with parts removed;

FIG. 8 is an edge view, looking in the direction of arrow 8 in FIG. 7, and

FIG. 9 is a section on line 9—9 of FIG. 7.

In order to properly disclose the invention, it is shown in FIG. 1 as being applied to a grocery cart which has a basket generally indicated at 10 and a platform at 12 with heels 14 mounting the same. The cart is provided with a handle for instance at 16 and adjacent the top of the cart at the rear portion thereof which is open, there is a swinging gate 18 hingedly mounted by a cross wire 20 at the top of the basket near the handle. The swinging gate as usual in carts of this nature can be swung up to a generally parallel relationship with the top of the basket when it is desired to nest other baskets therewith from the rear thereof, as is well known in the art.

Mounted pivotally with relation to the swinging gate 18 at the lower end thereof, there is a wall which is indicated herein at 22, this wall being pivoted at 24 to the gate 18; and between the swinging members 22 and 18 there is a two-part seat member.

The gate 18 is provided with leg holes 30 which can be seen in FIG. 3 and the child normally sits on the seat facing rearwardly with the wall 22 separated from swinging gate 18. There is a seat-forming member 32 which is a solid sheet of material for the comfort of the child and this seat may be either folded down to cover wire members 28 for the seating condition in which the leg holes 30, 30 are open, so that the child's legs may extend rearwardly of the cart out through the leg holes, or in some cases when it is not desired to use the seat construction 28 as a seat but as an auxiliary compartment or support, the seat member 32 may be swung up to close the holes, as shown in dotted lines in FIG. 3.

In the present case, the seat member 32 comprises a relatively rigid heavy piece of plastic or other suitable material which is provided with a rolled-over longitudinal edge portion generally indicated at 34. This rolled-over edge is generally cylindrical in shape and as seen in FIG. 6 its extreme edge at 36 comes down close to or abuts the general plane of the seat member at the under side thereof. This forms a tubular receptacle for an elongated wire or rod generally indicated at 38. This wire or rod is provided with a head or enlargement 40 adjacent one end 42 thereof but spaced inwardly therefrom, and the wire or rod 38 extends completely through the tubular portion 34 of the seat member 32 and extends out at the other end thereof as at 44.

The seat construction itself involves the two-part member 28 which is provided with a pivot member at 46, this being represented in FIG. 4 by the wire member so indicated upon which a member 48 pivots. Member 48 is a generally flat seat part made up of wire pieces as may be found to be desirable and itself pivots at one edge by means of eyes 50 on a horizontal wire member 52 forming a part of the wall member 22.

The wire 46 is provided with laterally bent arms 54, 54 at the ends thereof and these terminate in eyes 60 which are pivoted over a wire member 62 parallel to wire 52 and forming a part of the gate 18 so that it will be seen that the seat 28 is really in a two-part form which pivots substantially in the middle about the wire 46 as an axis and about wires 62 and 52, like a knuckle.

Now mounted on the seat part including wires 46 and 54, 54, there is a U-shaped wire member which has a central portion 64 having laterally extending arms 66 and 68 at the ends thereof, these arms terminating in eyes 70 and 72 respectively. The eye 72 is originally closed but the eye 70 is originally open as indicated in solid lines in FIG. 8, see also FIG. 7. The eyes 70 and 72 are aligned and are located close to the member 62.

The head 40 of rod 38 forms a stop against the closed eye 72 as clearly shown in FIGS. 4 and 7, and the assembler places the rod 38 through the tubular member 34 with the end 44 extending therefrom and then inserts the end at 42 of the rod 38 through the eye 72 with the head 40 abutting the same at the inside thereof, see FIG. 7. The end at 44 of the rod 38 is then placed in the open eye 70 whereupon this eye is merely closed up by any kind of tool convenient or desirable.

Once the eye 70 has been closed up, see dotted lines in FIG. 8, the rod 38 cannot be removed except by once more bending down or opening eye 70, but the seat member 32 is still capable of free pivotal action about the rod 38 as is desirable to open or close the leg holes 30, 30. The sheet-like seat member 32 can be replaced by anyone with a screwdriver or a similar tool but it will not fall from the rod 38 nor can it be deliberately detached therefrom by the customer as sometimes happens in the stores in which the carts are used. In any event, no accidental displacement of the seat member 32 is possible.

Having thus described my invention and the advantages thereof, I do not wish to be limited to the details herein disclosed, otherwise than as set forth in the claims, but what is claimed is:

1. A folding seat construction for nesting grocery carts including a swinging gate mounted on the cart, a pivoted wall associated with the swinging gate, a folding seat construction operatively associated with the gate and the wall to fold or to be extended between the wall and the gate, a seat-forming member pivotally mounted with relation to said folding seat construction, said seat-forming member comprising a generally flat sheet of material including a substantially cylindrical tubular member adjacent an edge thereof, a longitudinal rod-like member, a head on the rod-like member adjacent one end thereof, said head being spaced slightly from said one end leaving a short projection on the rod-like member beyond the head, the tubular member receiving the rod-like member so that the rod-like member is contained within the same, the tubular member abutting the head, said seat construction including a pair of spaced parallel resilient members, aligned eyes on the resilient members, one of the eyes receiving the short projection on the rod-like member at said one end thereof adjacent said head, the head abutting said eye at the side thereof facing the other eye, and the opposite end of the rod-like member being located in said other eye, the latter and the head confining the tubular member and the flat sheet of material that forms the seat, and the head and the adjacent end of the tubular member fixing the rod-like member against longitudinal shifting.

2. The folding seat construction of claim 1 wherein the said other eye is open to receive the opposite end of the rod-like member and the material of the eye is wire which can be bent to close it.

3. The folding seat construction of claim 1 wherein the seat construction comprises two interpivoted parts and the spaced eyes are located on one part.

4. The folding seat construction of claim 1 wherein the seat construction comprises two interpivoted parts and the spaced eyes are located on one part, the flat sheet-forming member having a position covering both seat parts or selectively may be pivoted to uncover both seat parts.

References Cited in the file of this patent

UNITED STATES PATENTS

| | | |
|---|---|---|
| 922,605 | Lenahan | May 25, 1909 |
| 2,837,344 | Young | June 3, 1958 |
| 2,837,345 | Young | June 3, 1958 |
| 2,860,885 | Schweitzer | Nov. 18, 1958 |
| 2,890,057 | Davis | June 9, 1959 |
| 2,952,470 | Lachance et al | Sept. 13, 1960 |
| 2,964,326 | Schray | Dec. 13, 1960 |